(12) United States Patent
Fujinoki et al.

(10) Patent No.: US 6,480,518 B1
(45) Date of Patent: Nov. 12, 2002

(54) SYNTHETIC QUARTZ GLASS MEMBER FOR USE IN ARF EXCIMER LASER LITHOGRAPHY

(75) Inventors: Akira Fujinoki, Koriyama (JP);
Takayuki Oshima, Koriyama (JP);
Hiroyuki Nishimura, Koriyama (JP);
Yasuyuki Yaginuma, Koriyama (JP)

(73) Assignees: Heraeus Quarzglas GmbH & Co. KG, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 0 days.

(21) Appl. No.: 09/517,888

(22) Filed: Mar. 3, 2000

(30) Foreign Application Priority Data

Mar. 4, 1999 (JP) ............................................ 11-057457

(51) Int. Cl.$^7$ ................................................ H01S 3/22
(52) U.S. Cl. ........................ 372/57; 359/350; 359/355; 65/30.1
(58) Field of Search ................................ 359/350, 355; 65/30.1; 372/57

(56) References Cited

U.S. PATENT DOCUMENTS 5,696,624 A * 12/1997 Komine et al. ............. 359/350
6,031,238 A * 2/2000 Fujinoki et al. ......... 250/492.2

FOREIGN PATENT DOCUMENTS

| EP | 0673888 A1 | 9/1995 |
| EP | 0691312 A1 | 1/1996 |
| EP | 0720969 A1 | 7/1996 |
| EP | 0720970 A1 | 7/1996 |
| EP | 0835848 A2 | 4/1998 |
| EP | 0870737 A1 | 10/1998 |
| EP | 00104780 | 7/2000 |
| WO | WO97/16382 | 5/1997 |
| WO | WO98/40319 | 9/1998 |
| WO | WO98/52879 | 11/1998 |

\* cited by examiner

Primary Examiner—Paul Ip
Assistant Examiner—Armando Rodriguez
(74) Attorney, Agent, or Firm—Milde & Hoffberg, LLP

(57) ABSTRACT

A synthetic glass member for use in excimer laser lithography, having superior homogeneity, high transmittance for ArF excimer laser beams and an excellent resistance against lasers is made from high purity synthetic quartz glass, and it is characterized in that layered structures, striae in three directions and internal strains are thermally and mechanically removed, the distribution of refractive index ($\Delta n$) in a plane orthogonal to the optical axis is up to about $1\times10^{-6}$, the distribution of refractive index ($\Delta n$) in a plane parallel to the optical axis is up to about $5\times10^{-6}$, the birefringence is up to about 2 nm/cm, the hydrogen molecule concentration is at least about $2\times10^{17}$ molecules/cm$^3$, and the internal transmittance is at least about 99.8% at a wavelength of 193.4 nm.

15 Claims, No Drawings

SYNTHETIC QUARTZ GLASS MEMBER FOR USE IN ARF EXCIMER LASER LITHOGRAPHY

DETAILED DESCRIPTION OF THE INVENTION

1. Field of Use

The present invention relates to a synthetic quartz glass member for use in the optical system of a lithographic apparatus employing an excimer laser as a light source and, in further detail, it relates to a synthetic quartz glass member for use in the illumination system or projection system, such as a lens, a prism and a beam splitter of an ArF excimer laser lithographic apparatus.

2. Prior Art

In recent years, along with the increasing degree of integration in LSIs, patterns for integrated circuits drawn on wafers have become finer and mass production has been started for a super LSI in which super fine patterns of quarter μm or less are drawn. For obtaining such a super fine pattern, the wavelength of optical sources for exposing and thereby drawing them have also to be made shorter, and steppers using an excimer laser as a light source have been developed and steppers using a KrF excimer laser (wavelength: 248 nm) as the light source have been put to practical use. Further, steppers using an ArF excimer laser (wavelength: 193 nm) as a light source have attracted attention as steppers for the next generation of apparatus. Quartz glass, fluorite and the like can be mentioned as glass materials showing sufficient transmittance even in a short wavelength region such as of a KrF excimer laser or the ArF excimer laser. Among them, synthetic quartz glass obtained by flame hydrolysis of silicon compounds and the like at high purity into transparent glass is suitable for optical materials to use in lithography using excimer lasers as the light source. Particularly, in the case of using the synthetic quartz glass as the optical material for the ArF excimer laser lithographic apparatus, it is said that a permissible limit for the internal transmittance at 193.4 nm of wavelength is 99.8% as described in Laid-Open Japanese Patent No. 53432/1998. Therefore, in this publication, the Na concentration is defined as 20 wt.-ppb or less. The synthetic quartz glass at the Na concentration of 20 wt.-ppb or less has been produced by a process under severe control for the synthesis conditions of quartz glass in order to prevent Na contamination by a secondary heat treatment such as a homogenizing treatment. In the ingot obtained under strict setting for the production conditions of the synthetic quartz glass, while the homogeneity in the longitudinal direction (optical axis) can be made higher, it is difficult to make the homogeneity higher in the direction perpendicular thereto (hereinafter referred to as a lateral direction). It is further difficult to remove striae in the lateral direction. They are formed when the conditions change even slightly during growing, so that the synthetic quartz glass ingots have to be produced under extremely strict production conditions. However, fringes in the lateral direction cannot be avoided. This is a phenomenon appearing regularly in the growing direction of the synthetic quartz glass ingots which is usually referred to as a layer or a layered structure and recognized as periodical and fine unevenness of the interference fringe observed upon transmission of a light in a direction perpendicular to the growing direction. The layered structure is a fine periodical structural fluctuation formed upon growing soot or glass by rotating a target for depositing the soot which, although it may differ as to density or thinness, cannot be removed completely by merely setting the production conditions. Then, the layered structure gives significant trouble in the case of using the synthetic quartz glass as a projection system, for example, a beam splitter (as described in "APPLIED OPTICS", Vol. 31, No. 31, pp. 6658–6661).

As mentioned above, the synthetic quartz glass described in Laid-Open Japanese Patent No. 53432/1998 cannot be used quite satisfactorily as a synthetic quartz glass member for use in ArF excimer laser lithography, particularly, as a synthetic quartz glass member for a projection system required for large size in view of its lack of homogeneity. Accordingly, the secondary heat treatment referred to in this publication is essential also in the synthetic quartz glass described in the publication. However, the homogenizing processing step or molding step described above is conducted at an extremely high processing temperature exceeding 1800° C. and the strain removing step also requires a long time for the processing although the processing temperature is relatively as low as about 1100° C. Therefore, thermal diffusion of Na takes place from furnace materials, crucibles and atmospheres to contaminate members during the secondary heat treatment to lower the transmittance. Due to the thermal diffusion of Na, the quartz glass causes a Na concentration gradient from the outer surface to the inside in which the Na concentration is higher near the outer surface and lower in the inside. This Na concentration gradient results in a transmittance distribution of the quartz glass and, when a lens is prepared from the synthetic quartz glass member described above for instance, the transmittance lowers at the outer circumference relative to the central part. As a result, not only uniform intensity of transmission light cannot be obtained but also distribution of the refractive index is caused by light absorption making it difficult to use it as the optical material of an exposure apparatus for use in ArF excimer laser lithography.

For using the synthetic quartz glass member suitably as a transmission material of an exposure apparatus for use in ArF excimer laser lithography, it is important to maintain the resistance to laser irradiation, namely, high transmittance and high homogeneity stably for a long period of time. Generally, when an excimer laser is irradiated to quartz glass, paramagnetic defects referred to as E'-center or NBOH-center (NBOHC) are formed and transmittance in a ultraviolet region is lowered since the defects have an absorption band in the ultraviolet region. Further, shrinking of quartz glass accompanied by laser irradiation, referred to as laser compaction, is also observed. The refractive index is increased owing to the shrinkage, thereby worsening the image focusing characteristics of the lens member in exposure apparatus.

SUMMARY OF THE INVENTION

It is an object of the invention to provide a quartz glass member for use in an ArF excimer laser having high homogeneity, as well as high transmittance to ArF excimer laser irradiation and also excellent resistance to the laser irradiation.

The invention is based on the finding that a synthetic quartz glass member having high transmittance and high homogeneity, as well as having excellent in the resistance to laser irradiation can be obtained by thermally or mechanically removing layered structures, striae in three directions and internal strains of a quartz glass ingot produced by using a silicon compound of high purity and irradiating with continuous ultraviolet rays at a wavelength of 260 nm or less to a synthetic quartz glass member having an Na concentration of 25 to 60 wt.-ppb.

The synthetic quartz glass member according to the invention not only has excellent homogeneity, but also exhibits high internal transmittance for ArF excimer laser radiation and high resistance against laser radiation and therefore, it is suitable as an optical material for ArF excimer laser steppers. In particular, since even a large member exceeding 200 mm in size has superior homogeneity, as well as exhibits high transmittance for ArF excimer laser radiation, it is useful as a material for lenses, beam splitters and the like for steppers.

DESCRIPTION OF THE PREFERRED EMBODIMENTS

The invention for attaining the foregoing object concerns a synthetic quartz glass member for use in ArF excimer laser lithography comprising a high purity synthetic quartz glass and characterized in that layered structures, striae in three directions and internal strains are thermally and mechanically removed, so that the distribution of refractive index ($\Delta n$) in a plane orthogonal to the optical axis is $1\times10^{-6}$ or less, the distribution of refractive index ($\Delta n$) in a plane parallel to the optical axis is $5\times10^{-6}$ or less, the birefringence is 2 nm/cm or lower, the hydrogen molecule concentration is $2\times10^{17}$ molecules/cm$^3$ or higher, and the internal transmittance for wavelength at 193.4 nm is 99.8% or higher.

Synthetic quartz glass of high purity may be produced by a direct flame hydrolysis method of depositing fine silica particles produced by flame hydrolysis of a silicon compound, for example, silicon tetrachloride and methyl trimethoxy silane and tetramethoxy silane of high purity, on a target and, simultaneously, vitrifying the compound under melting, or a soot method of depositing fine silica particles once on a target and then heat melting to vitrify in an electric furnace. Then, when the synthetic quartz glass is subjected to homogenization, layered structures, and striae in three directions are removed thermally and mechanically. High homogeneity is applied so that the distribution of refractive index ($\Delta n$) in a plane orthogonal to the optical axis is $1\times10^{-6}$ or less, the distribution of refractive index ($\Delta n$) in a plane parallel to the optical axis is $5\times10^{-6}$ or less, the birefringence is 2 nm/cm or lower. The homogenization is generally conducted in a refractory furnace while maintaining at a high temperature of 1800° C. or higher for a long period of time. However, contamination caused by impurities from furnace materials, jigs and atmospheres occurs during the homogenization, and, particularly, the Na concentration, which remarkably lowers the transmittance of the ArF excimer laser, increased to 30 wt.-ppb or more. Accordingly, it is preferred to use the method of homogenizing treatment described, for example, in European Patent Application EP-A1 673 888 by avoiding contact with a furnace material. Homogenization is a method of supporting a synthetic quartz glass ingot on both longitudinal ends by support members, forming a molten zone in the synthetic quartz glass ingot by a burner while rotating the ingot around an axis connecting the supported ends as a center, applying a pressure in the direction of the supporting axis and protruding outwardly in the molten zone, then supporting the side surfaces thereof on a support and then applying the same homogenization as described above. By this method, the Na concentration contained in the synthetic quartz glass member can be lowered to 20 wt.-ppb or less.

After the homogenization, a molding step is used to form an optical member in which it is formed into a square, cylindrical or prismatic shape of its intended application using the weight of the synthetic quartz glass or by a compulsory force. High temperature processing at 1900° C. or higher is used also in this molding, making Na contamination inevitable. Even when a graphite furnace with the ash content for Na concentration being 10 wt.-ppb or less is used, the Na concentration in the synthetic quartz glass is 10 wt.-ppb or more. While the synthetic quartz glass member obtained thereby is subjected to a strain removing step for removing internal strains, the processing requires a long processing time when conducted at a relatively low temperature such as 1100° C. or higher and the Na concentration in the synthetic quartz glass is 10 wt.-ppb or more even when an alumina furnace material at a purity of 99% or higher is used. When the homogenization treatment, molding and strain removing processing are applied to the synthetic quartz glass member as described above, at least about 25 wt.-ppb of Na is incorporated. Since Na is actually contaminated by the graphite or the external atmosphere, it is localized at a contact portion or near the surface of the glass material. That is, such a concentration distribution exists that the Na concentration is as high as 25 to 60 wt.-ppb near the surface and it decreases toward the inside of the glass material. Then, when continuous ultraviolet rays at a wavelength of 260 nm or less are irradiated to the synthetic quartz glass member with the Na concentration of 25 to 60 wt.-ppb, a structural change occurs in the quartz glass which results in a bleaching of an absorption induced by the Na content. Due to the bleaching of this absorption, the transmittance of the quartz glass member is increased. It is preferred that ultraviolet rays are irradiated at a higher irradiation dose to a portion nearer to the surface of the member and the irradiation dose decreases toward the inside, the transmittance is improved such that the Na concentration distribution is offset, and the transmittance is improved for the entire member, thereby enabling it to increase the internal transmittance to 99.8% or higher. This processing can improve the internal transmittance up to the range described above even for a large sized member such as a cylindrical shape of 200 mm diameter or more or a prismatic shape with a diagonal length of 200 mm or more for at least one plane.

Lamps for irradiating the continuous ultraviolet rays can include a low pressure mercury lamp with main wavelength of 253.7 nm and 184.9 nm, an $Xe_2$ excimer lamp with a wavelength of 172 nm or a KrCl excimer lamp with a wavelength of 222 nm. Further, the surface roughness $R_{max}$ of the synthetic quartz glass member to be irradiated with ultraviolet rays is preferably 30 $\mu$m or less. If the surface roughness exceeds 30 $\mu$m, scattering of ultraviolet rays is increased and no improvement can be expected for the processing effect. Furthermore, it is preferred that the irradiation dose of ultraviolet rays is at least 1 mW/cm$^3$ and the irradiation time is 50 hrs or more. When the irradiation dose is less than the range described above, there is no irradiation effect, whereas the internal transmittance cannot be improved to a desired level if the irradiation time is less than the range described above.

The synthetic quartz glass member according to this invention is preferably incorporated with hydrogen molecules such that stability can be maintained also for longterm use. The hydrogen molecule concentration is preferably $2\times10^{17}$ molecules/cm$^3$ or more. Hydrogen molecules can be incorporated at that concentration by optimizing the growing conditions of an ingot in the case of quartz glass produced by a direct flame hydrolysis method. It is preferred to treat a quartz glass body, as required, at a temperature of 1 atm or higher and at a temperature from 600 to 1200° C.

in a high-pressure hydrogen-processing furnace. Further, in the case of a soot method, the hydrogen molecules within the range described above can be incorporated also during or after sintering, by processing the quartz glass body at a pressure of 1 atm or higher and at a high temperature of from 600 to 1200° C. in the high pressure hydrogen processing furnace. By the incorporation of the hydrogen molecules within the range described above, the synthetic quartz glass member according to the invention is stable also to irradiation by ArF excimer laser beams for a long period of time and does not cause compaction or induced suction.

Physical property values for the following examples and comparative examples are values determined by the following measuring methods.

i) Refractive Index Distribution:
  Measuring method by a Fizeau interferometer (measured wavelength: 632.8 nm)
ii) Birefringence:
  Comparison method by observation with naked eyes relative to a standard inspection plate by a cross Nicol method
iii) Striae:
  Observation with naked eyes
iv) Internal Transmittance at 193 nm:
  Measuring method determined as (T/90.68)×100 relative to an apparent transmittance T% at 10 mm thickness, based on 90.68% obtained by subtracting 0.18% known as a loss in a Rayleigh scattering from 90.86%.
v) Na Concentration:
  Measuring method by a flameless atomic absorption analysis
vi) Hydrogen Molecular Concentration:
  Measuring method as described in V. S. Khottimchenko et al., J. Appl. Spectrosc., 46, 632–635 (1987)

EXAMPLES

Example 1

A synthetic quartz glass ingot of 100 mm in outer diameter and 600 mm in length was prepared by a direct flame hydrolysis method of introducing vaporized methyl trimethoxy silane at high purity into an oxyhydrogen flame to form a soot-like silica and melting and depositing the same on a rotating substrate. Both ends of the ingot were welded to support rods made of quartz glass held on chucks of a quartz glass fabrication lathe, and the synthetic quartz glass ingot was rotated. Removal of striae and homogenization of the ingot were accomplished by locally heating the rotating ingot by means of a burner to form a molten zone and changing the rotational direction and the number of rotation of the chuck independently thereby forming stresses in the molten zone. Subsequently, a rod-shaped synthetic quartz glass ingot was produced by narrowing the distance between the chucks of the quartz glass fabrication lathe, to press and deform the quartz glass ingot into a ball-like synthetic quartz glass, separating the ball-shaped synthetic quartz glass by cutting, attaching the synthetic quartz glass ingot (the cut faces being vertical to each other) to support rods of a support stand and softening under heating by a burner while rotating the ingot and homogenizing it again. Three directional striae or layered structures were not recognized in the resultant ingot. For molding the synthetic quartz glass ingot into a desired shape, the ingot was placed in a graphite crucible having Na ash of 20 wt.-ppb or less, the atmosphere inside the crucible was replaced with a nitrogen atmosphere, the temperature at the inside of the furnace was maintained at 1900° C., and kept for 10 minutes to mold the ingot. The resulting quartz glass member of 200 mm in outer diameter and 135 mm in thickness was placed in an electric furnace, whose furnace material was made from alumina of 99% purity or higher, kept at 1150° C. for 50 hours, cooled gradually to 600° C. at a cooling rate of 3° C./hr, and then spontaneously cooled to accomplish the strain removing operation. When the optical characteristics of the synthetic quartz glass member were examined, the refractive index distribution Δn in a plane orthogonal to the optical axis was $0.8 \times 10^{-6}$, the refractive index distribution Δn in a plane parallel to the optical axis was $3 \times 10^{-6}$ and the birefringence was 1 nm/cm or less. Further, the measured hydrogen molecule concentration was $6.50 \times 10^{17}$ molecule/cm$^3$. Analysis for metal impurities, indicated a concentration of impurities such as Li, K, Fe, Cu, Al and Ti was 5 wt.-ppb or less. Near the outer surface of the glass member, the Na concentration was 45 wt.-ppb, and it decreased toward the inside of the glass material. The quartz glass member was irradiated for 72 hours with ultraviolet rays from a low-pressure mercury lamp at an irradiation dose of 20 mW/cm$^2$. After the ultraviolet ray irradiation, a sample for transmittance measurement of 60 mm in outer diameter and 10 mm in thickness was cut out. The transmittance of the sample was measured, and showed a favorable transmittance of 99.82% of internal transmittance at a wavelength of 193.4 nm. The internal transmittance of the sample for transmittance measurement before irradiation of the ultraviolet rays was 99.65%.

Example 2

A quartz synthetic glass member was prepared by the same procedures as those in Example 1 except that it was kept for 50 hours at 1150° C. for the strain removing processing, gradually cooling down to 600° C. at a cooling rate of 5° C./hr and then conducting spontaneous cooling. No three directional striae or layered structures were recognized in the resultant synthetic quartz glass member. When the optical characteristics of the synthetic quartz glass member were examined, the refractive index distribution An in a plane orthogonal to the optical axis was $1 \times 10^{-6}$, the refractive index distribution An in a plane parallel to the optical axis was $4 \times 10^{-6}$, and the birefringence was 1 nm/cm or less. Further, the measured hydrogen molecule concentration was $9.60 \times 10^{17}$ molecule/cm$^3$ and analysis for metal impurities determined that the concentration of impurities such as Li, K, Fe, Cu, Al and Ti was 5 wt.-ppb or less. In the region of the outer surface of the glass member, the concentration of Na was 35 wt.-ppb, and it decreased toward the inside of the glass material. As in Example 1, the quartz glass member was irradiated for 72 hours with ultraviolet rays from a low pressure mercury lamp at an irradiation dose of 20 mW/cm$^2$. After the ultraviolet ray irradiation, a sample for transmittance measurement of 60 mm in outer diameter and 10 mm in thickness was cut out and transmittance was measured. A favorable transmittance was shown to be 99.85% of internal transmittance at wavelength of 193.4 nm. The internal transmittance of the sample for transmittance measurement before irradiation of the ultraviolet rays was 99.70%.

Example 3

A synthetic quartz glass ingot of 110 mm in outer diameter and 550 mm in length was prepared by a direct flame hydrolysis method of introducing vaporized silicon tetrachloride at high purity into an oxyhydrogen flame to form a soot-like silica and melting and depositing the silica on a rotating substrate. Homogenization was applied to the ingot under the same conditions as in Example 1 to thermally and mechanically remove layered structures, striae in three directions and internal strains. Molding the synthetic quartz glass ingot into a desired shape was conducted in the same manner as in Example 1. The resulting quartz glass member of 200 mm in outer diameter and 140 mm in thickness was placed in an electric furnace using alumina at 99% purity or higher as a furnace material, kept at 1150° C. for 50 hours and then cooled gradually to 600° C at a cooling rate of 6° C./hr and then spontaneously cooled to remove strains. When the optical characteristics of the synthetic quartz glass member were examined, the refractive index distribution An in a plane orthogonal to the optical axis was $1 \times 10^{-6}$, the refractive index distribution An in a plane parallel to the optical axis was $4 \times 10^{-6}$, and the birefringence was 1 nm/cm or less. Further, the measured hydrogen molecule concentration was $1.20 \times 10^{18}$ molecule/cm$^3$, and analysis for metal impurities determined that the concentration of impurities such as Li, K, Fe, Cu, Al and Ti was 5 wt.-ppb or less, and the chlorine concentration was 60 wt.-ppb. Near the outer surface of the glass member the N concentration was 25 wt.-ppb, and it decreased toward the inside of the glass material. The quartz glass member was irradiated for 72 hours with ultraviolet rays from a low pressure mercury lamp at an irradiation dose of 20 mW/cm$^2$. After the ultraviolet ray irradiation, a sample for transmittance measurement of 60 mm in outer diameter and 10 mm in thickness was cut out. When transmittance of the sample was measured, a favorable transmittance was shown as 99.80% of internal transmittance at a wavelength of 193.4 nm. The internal transmittance of the sample for transmittance measurement before irradiation of the ultraviolet rays was 99.42%.

Example 4

Vaporized silicon tetrachloride at high purity was introduced using oxygen as a carrier gas into oxyhydrogen flame and the formed soot silica was deposited on a rotating substrate to prepare a porous silica base member (soot) of about 200 mm in diameter and about 400 mm in length. The bulk density of the soot was about 1.2 g/cm$^3$. The soot was formed into a transparent glass in a tubular reactor made of quartz in an $H_2$ gas atmosphere at a temperature of about 1450° C. to obtain a transparent quartz glass ingot of 140 mm in outer diameter and about 300 mm in length. Then, homogenization was applied under the same conditions as those in Example 1 to thermally and mechanically remove the layered structures, striae in three directions and internal strains. The synthetic quartz glass ingot was molded into the same shape molding as in Example 1. The resulting quartz glass member had an outer diameter of 180 mm, was 160 mm thick, and was placed in an electric furnace, whose furnace material is made from alumina of 99% purity or higher, kept at 1150° C. for 50 hours, cooled gradually to 600° C. at a cooling rate of 6° C./hr and then spontaneously cooled to remove strains. A quartz glass member of 180 mm in outer diameter and 30 mm in thickness was cut out of the synthetic quartz glass body, and heat treated in a hydrogen gas at 1 atm at a temperature of 650° C. for about 200 hours to incorporate hydrogen molecules. When the optical characteristics of the synthetic quartz glass member were examined, the refractive index distribution An in a plane orthogonal to the optical axis was $1 \times 10^{-6}$, the refractive index distribution An in a plane parallel to the optical axis was $3 \times 10^{-6}$, and the birefringence was 1 nm/cm or less. Further, the measured hydrogen molecule concentration was $3.3 \times 10^{17}$ molecule/cm$^3$. Analysis for metal impurities determined that the concentration of impurities such as Li, K, Fe, Cu, Al and Ti was 5 wt.-ppb or less. Near the outer surface, the concentration of Na was 45 wt.-ppb and lower in the bulk material. Under the same conditions as in Example 1, ultraviolet rays were irradiated to the quartz glass member. After the ultraviolet ray irradiation, a sample for transmittance measurement of 60 mm in outer diameter and 10 mm in thickness was cut out. When transmittance of the sample was measured, a favorable transmittance was shown to be 99.80% of internal transmittance at a wavelength of 193.4 nm. The internal transmittance of the sample for transmittance measurement before irradiation of the ultraviolet rays was 99.64%.

Comparative Example 1

A synthetic quartz glass ingot of 180 mm in outer diameter and 250 mm in length was prepared in the same manner as in Example 1 by a direct flame hydrolysis method of introducing vaporized methyl trimethoxy silane at high purity into an oxyhydrogen flame to form soot-like silica and melting and depositing the silica on a rotating substrate. After keeping the ingot at 1150° C. for 70 hours without applying homogenizing processing of thermally and mechanically removing the layered structures, striae and internal strains, it was gradually cooled down to 600° C. at cooling rate of 2° C./hr and then spontaneously cooled. When the optical characteristics of the resultant synthetic quartz glass body were examined, the refractive index distribution An in a plane orthogonal to the optical axis was $3 \times 10^{-6}$, the refractive index distribution An in a plane parallel to the optical axis was $5 \times 10^{-6}$ and the birefringence was 1 nm/cm or less. However, when the area in the plane parallel to the optical axis was observed with naked eyes, remarkable striae layered structures were observed. Further, the measured hydrogen molecule concentration was $3.8 \times 10^{17}$ molecules/cm$^3$. Analysis for metal impurities, the concentration of impurities of such as Li, K, Fe, Cu, Al and Ti, determined that it was 5 wt.-ppb or less, and Na concentration was 30 wt.-ppb. A quartz glass body like that in Example 1 was irradiated for 72 hours with ultraviolet rays from a low pressure mercury lamp at an irradiation dose of 20 mW/cm. Then, a sample of 60 mm in outer diameter and 10 mm in thickness was cut out, and its transmittance was measured. It showed excellent transmittance as 99.90% for the internal transmittance at a wavelength of 193.4 nm, but striae layered structures existed, and it was not suitable as an optical member for the ArF excimer laser. Further, internal transmittance of the sample for measurement of transmittance before irradiation of ultraviolet rays was 99.78%.

Comparative Example 2 synthetic quartz glass body was prepared by the same procedures as those in Example 1 except for keeping at 1150° C. for 70 hours for strain removing processing, gradually cooling to 600° C. at a cooling rate of 2° C./hr, and then applying spontaneous cooling. Striae in three directions or the layered structures were not found in the resultant synthetic quartz glass body. When the optical characteristics of the resultant synthetic quartz glass member were examined, the refractive index distribution An in a plane orthogonal to the optical axis was $1 \times 10^{-6}$, a refractive index distribution An in a plane parallel with the optical axis was $3 \times 10^{-6}$ and the birefringence was 1 nm/cm or less. Further, the measured hydrogen molecule concentration was $2.80 \times 10^{17}$ molecules/cm. Analysis for metal impurities determined that the concentration of impurities, such as Li, K, Fe, Cu, Al and Ti, was 5 wt.-ppb or less, and the Na concentration was 65 wt.-ppb. A quartz glass body like that in Example 1 was irradiated for 72 hours with ultraviolet rays from a low pressure mercury lamp at an irradiation dose of 20 mW/cm Then, a sample for measuring the transmittance of 60 mm in outer diameter and 10 mm in thickness was cut out. The internal transmittance of the sample at a wavelength of 193.4 nm was 99.72%. The transmittance was somewhat insufficient for the optical member for an ArF excimer laser. Further, the internal transmittance of the sample for measurement of transmittance before irradiation of ultraviolet rays was 99.52%.

The foregoing specification and drawings have thus described and illustrated a novel improved synthetic quartz glass member for us in ArF excimer laser lithography which fulfills all the objects and advantages sought therefor. Many changes, modifications, variations and other uses and applications of the subject invention will, however, become apparent to those skilled in the art after considering this specification which discloses the preferred embodiments thereof. All such changes, modifications, variations and other uses and applications which do not depart from the spirit and scope of the invention are deemed to be covered by the invention, which is to be limited only by the claims which follow.

What is claimed is:

1. A synthetic quartz glass member for use in ArF excimer laser lithography comprising a high purity synthetic quartz glass and wherein layered structures, striae in three directions and internal strains are thermally and mechanically removed, the distribution of refractive index ($\Delta$n) in a plane orthogonal to the optical axis is $1 \times 10^{-6}$ or less, the distribution of refractive index ($\Delta$n) in a plane parallel to the optical axis is $5 \times 10^{-6}$ or less, the birefringence is 2 nm/cm or lower, the hydrogen molecule concentration is $2 \times 10^{17}$ molecules/cm$^3$ or higher, and the internal transmittance for wavelength at 193.4 nm is 99.8% or higher, wherein the synthetic quartz glass member shows an outer surface surrounding a bulk glass material, whereby there exists a Na concentration distribution such that the Na concentration is as high as 25 to 60 wt.-ppb at the outer surface and decreasing toward the bulk glass material, and whereby the synthetic quartz glass member was irradiated by ultraviolet rays at a wavelength of 260 nm or less and at an irradiation dose of at least 10 mW/cm$^2$ for at least 48 hours.

2. A synthetic quartz glass member for use in ArF excimer laser lithography as claimed in claim 1, wherein the synthetic quartz glass member is a member subjected to irradiation of continuous ultraviolet rays at a wavelength up to about 260 nm.

3. A synthetic quartz glass member for use in ArF excimer laser lithography as claimed in claim 1, wherein the synthetic quartz glass member is a cylindrical member at least about 200 mm in diameter or a prismatic member having a diagonal line at least about 200 mm in length for at least one lateral plane.

4. A synthetic quartz glass member for use in ArF excimer laser lithography as claimed in claim 2, wherein the synthetic quartz glass member is a cylindrical member at least about 200 mm in diameter or a prismatic member having a diagonal line at least about 200 mm in length for at least one lateral plane.

5. A synthetic quartz glass member for use in ArF excimer laser lithography as claimed in claim 1, wherein the surface roughness $R_{max}$ of the synthetic quartz glass member is up to about 30 $\mu$m.

6. A synthetic quartz glass member for use in ArF excimer laser lithography comprising a high purity synthetic quartz glass and wherein layered structures, striae in three directions and internal strains are thermally and mechanically removed, the distribution of refractive index ($\Delta$n) in a plane orthogonal to the optical axis is $1 \times 10^{-6}$ or less, the distribution of refractive index ($\Delta$n) in a plane parallel to the optical axis is $5 \times 10^{-6}$ or less, the birefringence is 2 nm/cm or lower, the hydrogen molecule concentration is $2 \times 10^{17}$ molecules/cm$^3$ or higher, and the internal transmittance for wavelength at 193.4 nm is 99.8% or higher, wherein the surface roughness $R_{max}$ of the synthetic quartz glass member is 30 $\mu$m or less.

7. A synthetic quartz glass member for use in ArF excimer laser lithography as claimed in claim 6, herein the synthetic quartz glass member is a member subjected to irradiation of continuous ultraviolet rays at a wavelength of 260 nm or less.

8. A synthetic quartz glass member for use in ArF excimer laser lithography as claimed in claim 7, wherein the synthetic quartz glass member is a cylindrical member of 200 mm or more in diameter or a prismatic member having a diagonal line of 200 mm or more in length for at least one lateral plane.

9. A synthetic quartz glass member for use in ArF excimer laser lithography as claimed in claim 6, wherein the synthetic quartz glass member is a cylindrical member of 200 mm or more in diameter or a prismatic member having a diagonal line of 200 mm or more in length for at least one lateral plane.

10. A synthetic quartz glass member for use in ArF excimer laser lithography as claimed in claim 1, wherein the synthetic quartz glass member shows an outer surface surrounding a bulk glass material, whereby there exists a Na concentration distribution such that the Na concentration is as high as 25 to 60 wt.-ppb at the outer surface and decreasing toward the bulk glass material, and whereby the synthetic quartz glass member was irradiated by ultraviolet rays at a wavelength of 260 nm or less and at an irradiation dose of at least 10 mW/cm$^2$ for at least 48 hours.

11. A synthetic quartz glass member for use in ArF excimer laser lithography, having a distribution of refractive index ($\Delta$n) in a plane orthogonal to the optical axis of $1 \times 10^{-6}$ or less, a distribution of refractive index ($\Delta$n) in a plane parallel to the optical axis of $5 \times 10^{-6}$ or less, and a birefringence is being 2 nm/cm or lower, and an internal transmittance at a wavelength of 193.4 nm of 99.8% or higher, said synthetic quartz glass member having an outer surface surrounding a bulk glass material, said synthetic quartz glass member having a hydrogen molecule concentration of $2 \times 10^{17}$ molecules/cm$^3$ or higher, and a Na concentration distribution with about 25 to 60 wt.-ppb at the outer surface and decreasing toward the bulk glass material, the synthetic quartz glass member being irradiated by ultraviolet rays at a wavelength of 260 nm or less and at an irradiation dose of at least 10 mW/cm$^2$ for at least 48 hours.

12. A synthetic quartz glass member for use in ArF excimer laser lithography as claimed in claim 11, herein the synthetic quartz glass member is a member subjected to irradiation of continuous ultraviolet rays at a wavelength of 260 nm or less.

13. A synthetic quartz glass member for use in ArF excimer laser lithography as claimed in claim 12, wherein the synthetic quartz glass member is a cylindrical member of 200 mm or more in diameter or a prismatic member having a diagonal line of 200 mm or more in length for at least one lateral plane.

14. A synthetic quartz glass member for use in ArF excimer laser lithography as claimed in claim 11, wherein the synthetic quartz glass member is a cylindrical member of 200 mm or more in diameter or a prismatic member having a diagonal line of 200 mm or more in length for at least one lateral plane.

15. A synthetic quartz glass member for use in ArF excimer laser lithography as claimed in claim 11, wherein the surface roughness $R_{max}$ of the synthetic quartz glass member is 30 µm or less.

* * * * *